(12) United States Patent
Ibuki et al.

(10) Patent No.: US 10,333,442 B2
(45) Date of Patent: Jun. 25, 2019

(54) MOTOR CONTROL DEVICE AND GAME MACHINE

(71) Applicant: OMRON Corporation, Kyoto-shi, Kyoto (JP)

(72) Inventors: Hiroyuki Ibuki, Ichinomiya (JP); Akihiro Ishii, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 59 days.

(21) Appl. No.: 15/630,171

(22) Filed: Jun. 22, 2017

(65) Prior Publication Data

US 2018/0026560 A1    Jan. 25, 2018

(30) Foreign Application Priority Data

Jul. 21, 2016   (JP) ................. 2016-143539

(51) Int. Cl.
*A63F 9/24* (2006.01)
*H02P 7/28* (2016.01)
*A63F 9/02* (2006.01)
*H02P 29/00* (2016.01)
*H02P 29/024* (2016.01)
*H02P 7/03* (2016.01)

(52) U.S. Cl.
CPC .......... *H02P 7/2805* (2013.01); *A63F 9/0243* (2013.01); *A63F 9/24* (2013.01); *H02P 7/04* (2016.02); *H02P 29/00* (2013.01); *H02P 29/024* (2013.01)

(58) Field of Classification Search
CPC ........ A63F 9/0243; A63F 9/24; H02P 7/2805; H02P 29/00
See application file for complete search history.

(56) References Cited

U.S. PATENT DOCUMENTS

2014/0364213 A1* 12/2014 Matsushita ......... G07F 17/3213
463/31
2015/0227125 A1* 8/2015 Matsushita ........... H02P 7/2805
273/460

FOREIGN PATENT DOCUMENTS

JP           2002-347296 A       12/2002

* cited by examiner

*Primary Examiner* — Tramar Y Harper
*Assistant Examiner* — Jeffrey K Wong
(74) *Attorney, Agent, or Firm* — MetroLexis Law Group, PLLC

(57) ABSTRACT

In a motor control device, a communication interface receives a control command defining a target rotation amount and a target rotation speed of a motor. A sensor interface receives a detection signal from a rotation angle sensor outputting a detection signal in every rotation of the motor at a predetermined angle. A controller decides a set value of a rotation speed of the motor. A drive signal generator generates and outputs a drive signal for rotating the motor. The controller calculates a difference between the target rotation amount and a total rotation amount of the motor from start of execution of the control command, based on the number of received detection signals, and determines whether an abnormality occurs in operation of the motor based on an update frequency of a minimum value of the difference or a non-update period when the minimum value of the difference is not updated.

15 Claims, 11 Drawing Sheets

| Operation | TR1 | TR2 | TR3 | TR4 |
|---|---|---|---|---|
| Forward rotation, drive | ON | OFF | OFF | ON |
| Forward rotation, stop | OFF | OFF | OFF | OFF |
| Backward rotation, drive | OFF | ON | ON | OFF |
| Backward rotation, stop | OFF | OFF | OFF | OFF |
| Brake | OFF | OFF | ON | ON |

300

| Actual rotation speed | Decrease weighting amount |
|---|---|
| 0 (stop) | 1−(0/16)=1 |
| 1 | 1−(1/16)=0.9 |
| 2 | 1−(2/16)=0.9 |
| 3 | 1−(3/16)=0.8 |
| 4 | 1−(4/16)=0.8 |
| 5 | 1−(5/16)=0.7 |
| 6 | 1−(6/16)=0.6 |
| 7 | 1−(7/16)=0.6 |
| 8 | 1−(8/16)=0.5 |
| 9 | 1−(9/16)=0.4 |
| 10 | 1−(10/16)=0.4 |
| 11 | 1−(11/16)=0.3 |
| 12 | 1−(12/16)=0.3 |
| 13 | 1−(13/16)=0.2 |
| 14 | 1−(14/16)=0.1 |
| 15 | 1−(15/16)=0.1 |
| 16 | 1−(16/16)=0 |

900

| Detection system | | | Abnormality type |
|---|---|---|---|
| Stop signal | Intermittent stop signal | Speed decrease signal | |
| H | H | H | Slight vibration (not reaching target position) |
| L | H | H | Intermittent stop |
| L | L | H | Speed decrease |
| L | L | L | No abnormality operation |

MOTOR CONTROL DEVICE AND GAME MACHINE

CROSS-REFERENCE TO RELATED APPLICATION

This application is based on Japanese Patent Application No. 2016-143539 filed with the Japan Patent Office on Jul. 21, 2016, the entire contents of which are incorporated herein by reference.

FIELD

The disclosure relates to a motor control device for controlling a motor, and a game machine having such a motor control device.

BACKGROUND

Game machines, such as a slot game machine and a pinball game machine, have been devised to perform presentation that arouses the player's visual sense, auditory sense, or feeling so as to enhance the player's interest. Especially for performing presentation that arouses the player's visual sense, a movable body, such as a movable accessory, may be provided in the game machine. A motor is used for driving such a movable body. For moving the movable body by a predetermined moving amount at a predetermined speed in accordance with the presentation, a motor control device is used, for example. The motor control device receives a control command including a target speed and a target rotation amount from an upper-level device, for example, and controls the motor in accordance with the command.

In order to enhance the player's interest, a large-sized movable accessary may be mounted in the game machine. Driving such a movable accessary requires a motor having high torque. There may thus be used a direct current (DC) motor that is cheaper than a stepping motor, and is smaller in size than the stepping motor to exert the same torque. In this case, along with the DC motor, a rotation angle sensor, such as a rotary encoder, is used which outputs a detection signal in every rotation of the DC motor at a predetermined rotation angle. The motor control device counts the number of times it received a detection signal from the rotation angle sensor, and can thereby determine whether or not the moving amount of the movable body has reached the predetermined moving amount. When the moving amount reaches the predetermined moving amount, the motor control device stops the rotation of the DC motor.

In the case of driving the movable body by using the motor such as the DC motor, a mechanical mechanism constituting the movable body may be locked to restrict the move of the movable body. In such a case, by the motor forcibly moving the movable body, an overload may be applied to the motor to generate heat, causing a breakdown or ignition. For detecting such an abnormality, there has been proposed a technique of detecting a locked state of the motor when a state continues for a certain period of time where a duty ratio of a pulse signal outputted from a pulse width modulation (PWM) circuit is the maximum value (e.g., see Japanese Patent Application No. 2002-347296).

However, the motor may rotate backward due to external application of unexpected force to the movable body. While the moving body is not completely locked, the movable body may become only able to move at a moving speed lower than an intended moving speed due to an increase in friction caused by some factor. As a result, the motor can only rotate at a lower rotation speed than the target speed. In such a case, with the motor rotating itself, the state where the duty ratio of the pulse signal is the maximum value does not continue, which may result in failure to detect such an abnormality in the above technique.

SUMMARY

Accordingly, it is an object of an embodiment of the present invention to provide a motor control device capable of detecting an abnormality where a motor cannot perform intended operation.

As one aspect of the present invention, a motor control device for controlling a motor is provided. This motor control device may include: a communication interface configured to receive from an external device a control command for defining a target rotation amount and a target rotation speed of the motor; a sensor interface configured to receive the detection signal from a rotation angle sensor for outputting a detection signal in every rotation of the motor at a predetermined angle; a controller configured to decide a set value of a rotation speed of the motor in accordance with the control command; and a drive signal generator configured to generate a drive signal for rotating the motor in accordance with the set value of the rotation speed, and configured to output the drive signal.

The controller may calculate a difference between the target rotation amount and a total rotation amount of the motor from start of execution of the control command based on the number of the received detection signals, and determine the occurrence or non-occurrence of an abnormality in operation of the motor based on at least any one of an update frequency of a minimum value of the difference between the target rotation amount and the total rotation amount and a non-update period when the minimum value of the difference is not updated.

In this motor control device, it may be preferable that the controller determines the occurrence of an abnormality in operation of the motor when the update frequency of the minimum value of the difference between the target rotation amount and the total rotation amount in an immediate predetermined period is not larger than a predetermined update frequency threshold.

Further, in this motor control device, it may be preferable that the controller determines the occurrence of an abnormality in operation of the motor when a non-update period for the minimum value of the difference between the target rotation amount and the total rotation amount is longer than a predetermined period threshold.

Moreover, in this motor control device, it may be preferable that the controller measures an actual rotation speed of the motor based on the number of the received detection signals in a predetermined sampling period, and it may be preferable that the controller determines the occurrence or non-occurrence of an abnormality in operation of the motor based on the actual rotation speed. In this case, when determining the occurrence of an abnormality in operation of the motor, it may be preferable that the controller determines a type of the abnormality based on which of the update frequency of the minimum value of the difference between the target rotation amount and the total rotation amount, the non-update period, and the actual rotation speed is used to determine the abnormality in operation of the motor.

Furthermore, in this motor control device, it may be preferable that the controller obtains a decrease weighting amount that increases with increase in difference between the target rotation speed and the actual rotation speed with respect to each of predetermined sampling periods, and when a total of the decrease weighting amounts in the immediate predetermined period is larger than a predetermined threshold, it may be preferable that the controller determines the occurrence of an abnormality in operation of the motor.

According to another aspect, a game machine may include: a game machine body; a movable body movably disposed on a front surface of the game machine body; a motor configured to drive the movable body; a rotation angle sensor configured to output a detection signal in every rotation of the motor at a predetermined angle; a motor control device configured to control the motor; and a presentation controller configured to control presentation in accordance with a state of a game. In this game machine, the presentation controller may generate a control command for defining a target rotation amount and a target rotation speed of the motor in accordance with the state of the game, and transmits the control command to the motor control device. The motor control device may include a communication interface configured to receive a control command from the presentation controller, a sensor interface configured to receive the detection signal from the rotation angle sensor, a controller configured to decide a set value of a rotation speed of the motor in accordance with the control command, and a drive signal generator configured to generate a drive signal for rotating the motor in accordance with the set value of the rotation speed, and configured to output the drive signal. The controller of the motor control device may calculate a total rotation amount of the motor from start of execution of the control command based on the number of the received detection signals, and determines the occurrence or non-occurrence of an abnormality in operation of the motor based on at least any one of the update frequency of a minimum value of the difference between the target rotation amount and the total rotation amount and the non-update period when the minimum value of the difference is not updated.

The motor control device according to one or more embodiments of the present invention may exert the effect of being able to detect an abnormality where the motor cannot perform intended operation.

DETAILED DESCRIPTION

Hereinafter, a motor control device according to one embodiment of the present invention will be described with reference to the drawings. When this motor control device receives from an upper-level control device a control command including control information for defining operation of a motor, such as a target rotation amount and a target rotation speed of the motor, the motor control device controls the motor in accordance with the control information. This motor control device then determines whether or not an abnormality has occurred in operation of the motor by using a plurality of abnormality detection methods capable of detecting a rotation speed decrease or stoppage of the motor based on a detection signal from a rotation angle sensor provided for detecting a rotation amount of the motor.

In the embodiment, a motor being a control object of the motor control device is a DC motor. However, the motor being the controlled object of the motor control device is not restricted to the DC motor, and may be any of various types of motors with rotation amounts detected by the rotation angle sensor.

Figure 1:
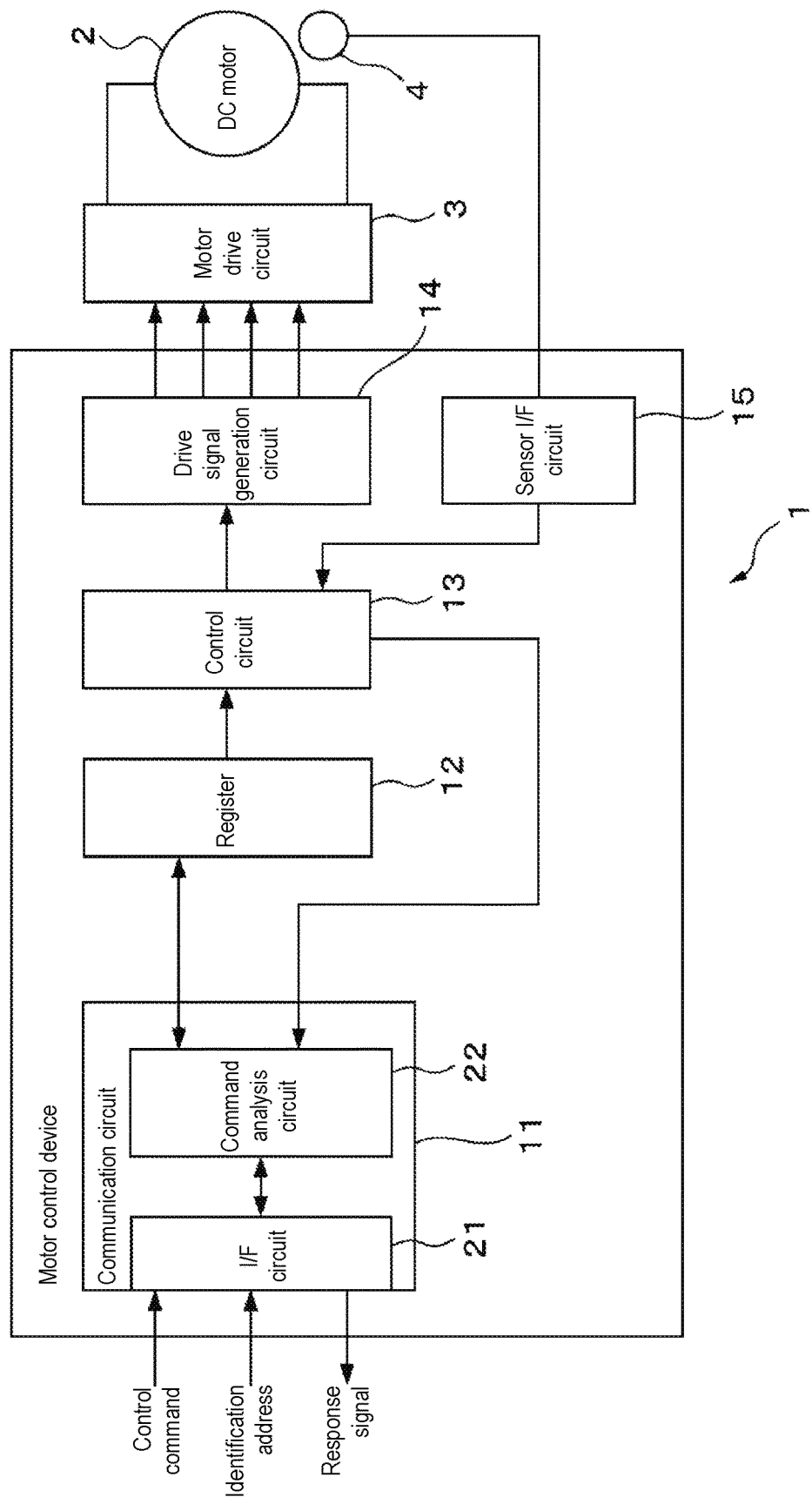
FIG. 1 is a schematic configuration diagram of a motor control device according to one embodiment of the present invention.

FIG. 1 is a schematic configuration diagram of a motor control device according to one embodiment of the present invention. As illustrated in FIG. 1, a motor control device 1 includes a communication circuit 11, a register 12, a control circuit 13, a drive signal generation circuit 14, and a sensor interface circuit 15.

Each of these units included in the motor control device 1 may be mounted on a circuit board (not illustrated) as a separate circuit, or may be mounted on the circuit board as an integrated circuit where these units are integrated.

The motor control device 1 controls a DC motor 2 in accordance with a control command received from an upper-level control device. Specifically, the motor control device 1 rotates the DC motor 2 at a target rotation speed specified by the control command. In the embodiment, the motor control device 1 is generated according to a pulse width modulation (PWM) technique, and controls a rotation speed of the DC motor 2 by outputting a drive signal to a motor drive circuit 3 for supplying a current to the DC motor 2, the drive signal switching the on and off of supply of a current to the DC motor 2. In every rotation of a rotary shaft (not illustrated) of the DC motor 2 at a predetermined angle, the motor control device 1 receives from a rotary encoder 4 a detection signal showing that the rotary shaft has rotated at the predetermined angle. The motor control device 1 then calculates a total rotation amount from the start of execution of the control command. The motor control device 1 then stops the DC motor 2 at the time when the total rotation amount reaches the target rotation amount specified by the control command.

Figures 2, 3:
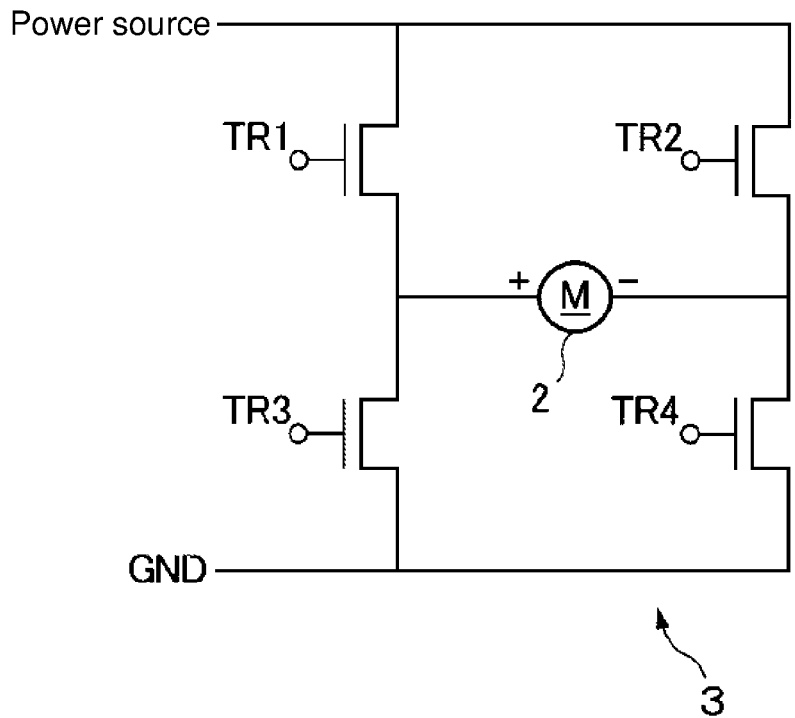
FIG. 2 is a circuit diagram of a motor drive circuit.
FIG. 3 is a diagram illustrating an example of a table that represents a relation between a drive signal applied to each switch of the motor drive circuit and a rotation direction of a DC motor.

FIG. 2 is a circuit diagram of the motor drive circuit 3. The motor drive circuit 3 has four switches TR1 to TR4. Note that each switch can be a transistor or a field-effect transistor, for example. Among the switches, two switches TR1 and TR3 are connected in series between a power source and a ground. Similarly, two switches TR2 and TR4 are connected in series between the power source and the ground. A positive side terminal of the DC motor 2 is connected between the switches TR1 and TR3, while a negative side terminal of the DC motor 2 is connected between the switches TR2 and TR4. A switch terminal of each of the switches TR1 to TR4 (e.g., when the switches TR1 to TR4 are transistors, the switch terminal corresponds to a base terminal, and when the switches TR1 to TR4 are field-effect transistors, the switch terminal corresponds to a gate terminal) is connected to the drive signal generation circuit 14. A drive signal from the drive signal generation circuit 14 is inputted into the switch terminal of each of the switches TR1 to TR4.

FIG. 3 is a diagram illustrating an example of a table that represents a relation between the drive signal applied to each switch and the rotation direction of the DC motor 2.

As shown in Table 300, when the DC motor 2 is rotated forward, a drive signal is applied to the switch terminal of the switch TR1 and the switch terminal of the switch TR4, the drive signal having been set according to the PWM technique and including a periodical pulse that has a pulse width in accordance with the rotation speed of the DC motor 2. Meanwhile, the drive signal is not applied to the switch terminal of the switch TR2 or the switch terminal of the switch TR3. Thus, since a source voltage is applied to the positive side terminal of the DC motor 2 only during application of a pulse to each of the switches TR1 and TR4, the DC motor 2 rotates forward at a speed in accordance with a pulse width of the applied pulse.

When the DC motor 2 is to be rotated forward, the drive signal may be applied to either the switch TR1 or TR4 and the other switch may be kept always on.

On the other hand, when the DC motor 2 is rotated backward, a drive signal is applied to the switch terminal of the switch TR2 and the switch terminal of the switch TR3, the drive signal having been set according to the PWM technique and including a periodical pulse in accordance with the rotation speed of the DC motor 2. Meanwhile, the drive signal is not applied to the switch terminal of the switch TR1 or the switch terminal of the switch TR4. Thus, since a source voltage is applied to the negative side terminal of the DC motor 2 only during application of a pulse to the switch TR2 and the switch TR3, the DC motor 2 rotates backward at a speed in accordance with a pulse width of the applied pulse.

When the DC motor 2 is to be rotated backward, the drive signal may be applied to either the switch TR2 or TR3 and the other switch may be kept always on.

When a brake is to be put on the DC motor 2, the switch terminal of the switch TR3 and the switch terminal of the switch TR4 are turned on, and the switch terminal of the switch TR1 and the switch terminal of the switch TR2 are turned off.

When the DC motor 2 is not to be driven, the switch terminal of each switch is turned off.

The rotary encoder 4 is an example of the rotation angle sensor and can be an optical type rotary encoder, for example. The rotary encoder 4 includes a disk, a light source and light receiving elements, for example, the disk being fitted to a rotary shaft of the DC motor 2 and having a plurality of slits along a direction of a circumference centered at the rotary shaft, the light source and the light receiving elements being disposed so as to be opposed to each other with the disk placed therebetween. Every time any of the slits is located between the light source and the light receiving elements, light from the light source reaches the light receiving elements, and the rotary encoder 4 outputs a pulse-shaped detection signal. The rotary encoder 4 outputs a detection signal in every rotation of the DC motor 2 at a predetermined angle. For example, by providing 50 slits on the disk along the direction of the circumference centered at the rotary shaft of the DC motor 2, the rotary encoder 4 outputs 50 detection signals during one revolution of the rotary shaft of the DC motor 2.

Hereinafter, each unit of the motor control device 1 will be described.

The communication circuit 11 includes a communication interface 21 and a command analysis circuit 22, for example.

The communication interface 21 has an interface circuit for connecting between the upper-level control device and the motor control device 1. Note that the upper-level control device is, for example, a presentation CPU of a game machine mounted with the motor control device 1. The communication interface 21 receives from the upper-level control device a control command having a plurality of bits that are transmitted serially.

Further, the communication interface 21 receives from the upper-level control device an identification address for specifying the motor control device to be a controlled object of the control command. Moreover, in order to analyze the control command, the communication interface 21 may also receive from the upper-level control device a clock signal for synchronizing with each of the plurality of bits included in the control command. The clock signal can, for example, be a signal having a rectangular-shaped pulse for each predetermined number of bits in the control command.

When receiving the control command, the identification address, and the clock signal, the communication interface 21 outputs those to a command analysis circuit 22. Further, the communication interface 21 transmits to the upper-level control device an order completion signal and the like received from the command analysis circuit 22.

In every reception of the control command from the upper-level control circuit via the communication interface 21, the command analysis circuit 22 analyzes that control command. The command analysis circuit 22 then executes processing in accordance with the control command.

In the embodiment, there exist three kinds of control commands. An operation order being one of the control commands includes operation information for specifying operation of the DC motor 2, such as the target rotation amount of the DC motor 2 which corresponds to a moving amount of a movable body to be driven by the DC motor 2, and the target rotation speed of the DC motor 2. Further, a setting order being another one of the control commands includes setting information for defining a setting about the DC motor 2. Note that each of the operation information and the setting information is an example of control information for defining operation of the motor. Still another one of the control commands is a state reading order for making a request to read some or all pieces of the control information stored in the register 12 and to transmit the read information to the upper-level control device.

Figure 4:
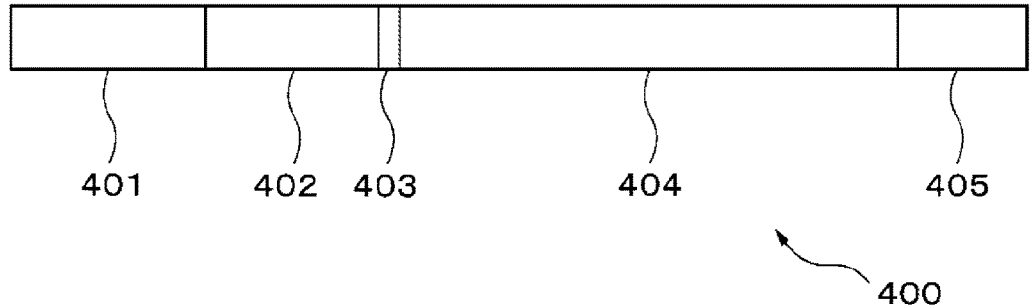
FIG. 4 is a diagram illustrating an example of a format of a control command.

FIG. 4 is a diagram illustrating an example of a format of the control command. As illustrated in FIG. 4, the control command 400 includes a START flag 401, a device address 402, a mode setting flag 403, control data 404, and an END flag 405. Further, the control command 400 may include a one-bit spacer having a value of, for example, '0' between adjacent flags, addresses, and data.

The START flag 401 is a bit string representing the head of the control command 400, and in the embodiment, it is a bit string of successive nine bits each having a value of '1'. Note that the START flag 401 may simply be a bit string not matching any other arbitrary bit string in the control command 400.

The device address 402 is identification information for specifying the motor control device to be a controlled object of the control command 400. In the embodiment, the device address 402 is represented by a bit string having an eight-bit length. The device address 402 is subjected to determination by the command analysis circuit 22 of the communication circuit 11 as to whether or not it matches an identification address separately received from the upper-level control device. When it matches, the motor control device 1 is determined to be the control object of the control command 400.

The mode setting flag 403 is a two-bit flag representing the kind of the control command. The kind of the control command is shown based on combination of the bit values in the mode setting flag 403.

For example, when the value of the mode setting flag is '00', the control command is the operation order including the operation information. When the value of the mode setting flag is '01', the control command is the setting order including the setting information. When the value of the mode setting flag is '10', the control command is the state reading order.

The command analysis circuit 22 refers to the value of the mode setting flag 403 to specify the kind of the control command, and executes processing in accordance with that kind. Note that a detail of the processing of the command analysis circuit 22 will be described later.

When the control command is the operation order, the control data 404 includes operation information of the DC motor 2 controlled by the motor control device 1. For example, the control data 404 includes data representing a rotation direction, data representing a target rotation speed and data representing a target rotation amount. When the control command is the setting order, the control data 404 includes, for example, a flag showing whether or not the current operation of the DC motor is to be suspended, data representing a set range of the speed, and data representing resolving power of the rotation angle of the DC motor 2 which is detected by the rotary encoder 4.

When the control command is the state reading order, the control data 404 includes address specifying information for specifying an address to be a reading target among addresses in the register 12. For example, the address specifying information is represented by a bit string with a predetermined length which occupies a predetermined position in the control data 404. Then, from values of the bit string which are the address specifying information, a range of control information to be a reading object is specified. For example, the address specifying information specifies any one of an address that stores some or all pieces of operation information of the operation order currently in execution, an address that stores some or all pieces of setting information related to the operation order currently in execution, an address that stores some or all pieces of operation information of an operation order in waiting (i.e., an operation order to be executed next), an address that stores the current position of the DC motor 2, and an address corresponding to all pieces of control information stored in the register 12.

The END flag 405 is a bit string representing the end of the control command 400. The END flag 405 may simply be a bit string not matching the START flag or the other bit strings included in the control command.

The command analysis circuit 22 compares the identification address with a device address included in the control command. When the identification address does not match the device address, the motor control device 1 is not a controlled object of the received control command, and hence, the command analysis circuit 22 discards that control command. On the other hand, when the identification address matches the device address, the command analysis circuit 22 determines that the motor control device 1 is a controlled object of that control command. The command analysis circuit 22 then executes processing in accordance with the kind of that control command.

Note that the command analysis circuit 22 may have a memory circuit for storing an identification address so as to determine whether or not the identification address matches the device address even when the identification address and the control command are received at different timings.

When the control command is the operation order or the setting order, the command analysis circuit 22 writes into the register 12 the control information included in the control command. Meanwhile, when the control command is the state reading order, the command analysis circuit 22 refers to the address specifying information included in the control data and specifies an address for reading some or all pieces of control information from the register 12. The command analysis circuit 22 then reads control information stored in the specified address in the register 12, and generates a response signal including the control information. Note that a response signal may include information for specifying a destination of the response signal, such as an address of the upper-level control device. Further, the response signal may further include information for identifying the motor control device 1, such as an identification address of the motor control device 1.

When generating a response signal, the command analysis circuit 22 transmits the response signal to the upper-level control device via the communication interface 21.

When one operation order about the DC motor 2 controlled by the motor control device 1, which is stored in the register 12, is executed, for example when the DC motor 2 rotates by a target rotation amount included in the operation order, the command analysis circuit 22 may generate an order completion signal showing that the operation order has been executed, and may transmit the order completion signal to the upper-level control device via the communication interface 21.

Further, when being notified of the type of the abnormality having occurred in the DC motor 2 from the control circuit 13, the command analysis circuit 22 generates an abnormality generation signal for representing the type of the abnormality, and transmits the abnormality generation signal to the upper-level control device via the communication interface 21.

The register 12 has a memory circuit having a memory capacity capable of storing at least one of pairs of the setting information and the operation information of the DC motor 2. The memory circuit included in the register 12 is made of a volatile, readable and writable semiconductor memory circuit, for example.

The register 12 stores the setting information and the operation information written therein by the communication circuit 11. When the control circuit 13 reads the setting information and the operation information, the register 12 may delete the setting information and the operation information. Further, the register 12 may store information representing the current position of the movable body driven by the DC motor 2, such as a rotation amount of the DC motor 2 from one end of a movable range of the movable body.

When the command analysis circuit 22 of the communication circuit 11 makes a request of the register 12 to read control information, the register 12 reads control information stored in an address included in the request, and outputs the read control information to the command analysis circuit 22.

The control circuit 13 includes a processor and a non-volatile memory circuit, for example. The control circuit 13 refers to the operation information and the setting information read from the register 12, to decide the rotation direction of the DC motor 2. The control circuit 13 decides a duty ratio of the drive signal based on the operation information and the setting information. At this time, for example, the control circuit 13 may simply refer to a speed table representing a correspondence relation between the duty ratio and the value of the target rotation speed, previously stored in the memory circuit, to decide a duty ratio corresponding to the target rotation speed. Note that this duty ratio is an example of the set value of the rotation speed of the DC motor 2. The control circuit 13 then notifies the rotation direction and the duty ratio to the drive signal generation circuit 14.

In every execution of the operation order, after the DC motor 2 starts rotating by the execution of the operation order, the control circuit 13 counts the number of detection signals received from the rotary encoder 4, and takes a total of received detection signals as the total rotation amount of the DC motor 2. Then, the control circuit 13 writes the total rotation amount (i.e., the current position of the DC motor 2 or the movable body driven by the DC motor 2) into the register 12.

In every update of the total rotation amount of the DC motor 2, the control circuit 13 calculates as a remaining rotation amount a difference between the total rotation amount and the target rotation amount included in the operation order. The control circuit 13 then regulates the duty ratio based on the remaining rotation amount such that the DC motor 2 rests at the point in time when the DC motor 2 rotates by the target rotation amount specified by the operation order. For example, when the remaining rotation amount becomes a predetermined value or lower, the control circuit 13 may decrease the duty ratio with decrease in remaining rotation amount. At the point in time when the remaining rotation amount becomes 0, the control circuit 13 sets the duty ratio to 0.

When the total rotation amount reaches the target rotation amount, the control circuit 13 notifies to the command analysis circuit 22 of the communication circuit 11 that the execution of the operation order has been completed. The control circuit 13 then deletes from the register 12 the control information concerning the operation order, the execution of which has been completed.

Further, the control circuit 13 detects an abnormality where the DC motor 2 cannot perform operation specified by the control command with some cause based on the detection signal received from the rotary encoder 4. Note that a detail of this abnormality detection will be described later.

The drive signal generation circuit 14 includes, for example, a variable pulse generation circuit capable of changing a width of an outputted pulse, and a switch circuit for switching which of the switches in motor drive circuit 3 a periodic pulse signal being the drive signal is outputted to. Then, in accordance with the duty ratio notified from the control circuit 13, the drive signal generation circuit 14 generates a drive signal for driving the DC motor 2 according to the PWM technique, and outputs the drive signal to any of the switches in the motor drive circuit 3. Note that a length of one period of the drive signal is 50 μsec, for example. For example, when the rotation direction notified from the control circuit 13 is the forward rotation, the drive signal generation circuit 14 outputs a periodic pulse signal to each of the switches TR1 and TR4 in the motor drive circuit 3. On the other hand, when the rotation direction notified from the control circuit 13 is the backward rotation, the drive signal generation circuit 14 outputs a periodic pulse signal to each of the switches TR2 and TR3 in the motor drive circuit 3.

The sensor interface circuit 15 has an interface circuit for receiving a detection signal from the rotary encoder 4. In every reception of a detection signal, the sensor interface circuit 15 outputs the detection signal to the control circuit 13.

Hereinafter, an abnormality detection process performed by the control circuit 13 will be described.

Figure 5:
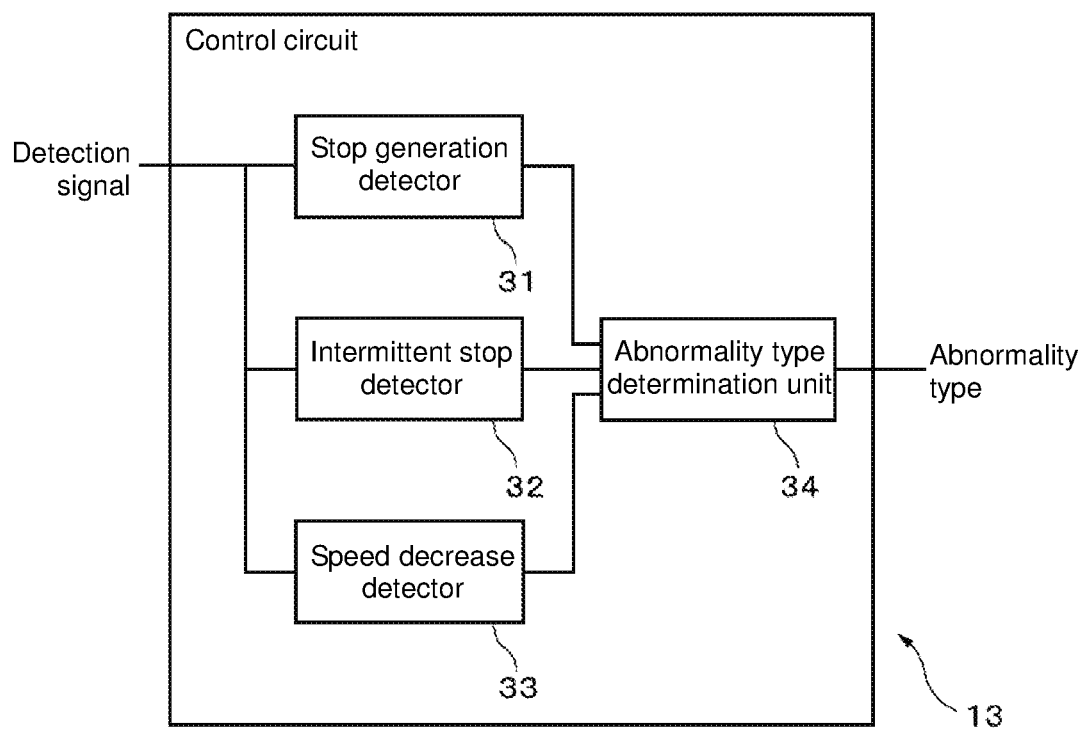
FIG. 5 is a function block diagram of a control circuit concerning abnormality detection.

FIG. 5 is a function block diagram of the control circuit 13 concerning abnormality detection. The control circuit 13 includes a stop generation detector 31, an intermittent stop detector 32, a speed decrease detector 33, and an abnormality type determination unit 34. Each of these units included in the control circuit 13 is mounted, for example, as a circuit included in the control circuit 13 or as a part of firmware that operates on the control circuit 13.

The stop generation detector 31 determines whether or not an abnormality has occurred in operation of the DC motor 2 based on a non-update period which is a period when the minimum value of a difference between the target rotation amount and the total rotation amount of the DC motor 2 is not updated.

Figure 6:
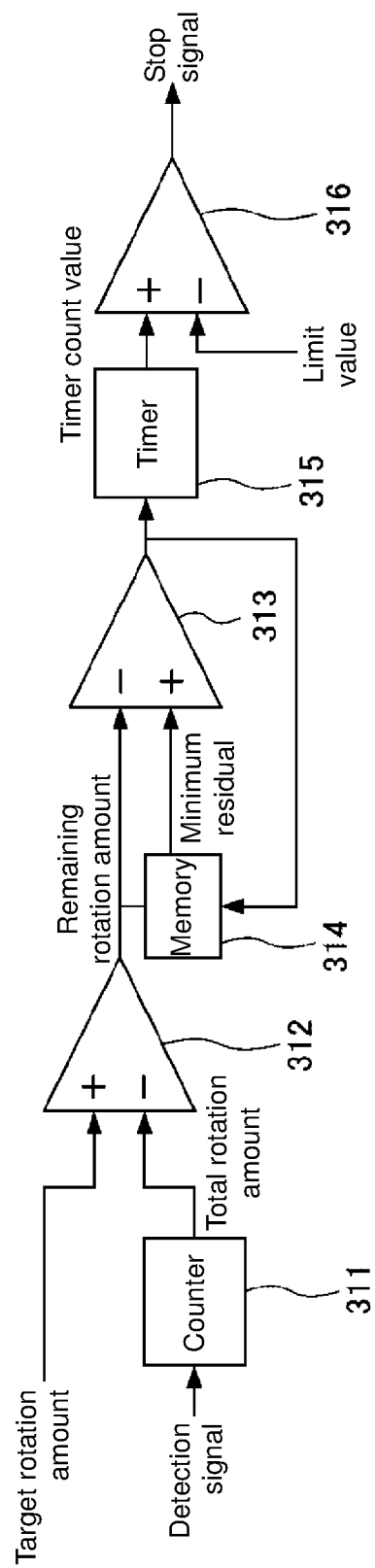
FIG. 6 is an equivalent circuit diagram of a stop generation detector.

FIG. 6 is an equivalent circuit diagram of the stop generation detector 31. The stop generation detector 31 includes a counter 311, a differentiator 312, a comparator 313, a memory 314, a timer 315, and an output circuit 316. These circuits included in the stop generation detector 31 may be configured as part of the control circuit 13, or may be achieved by a program that is operated on the control circuit 13.

In every execution of a new control command, the counter 311 resets the number of detection signals received from the rotary encoder 4, namely the total rotation amount, to 0. After the start of execution of the control command, the counter 311 increments the total rotation amount by one in every reception of the detection signal from the rotary encoder 4. The counter 311 then outputs the total rotation amount to the differentiator 312.

The differentiator 312 calculates a difference between the target rotation amount and the total rotation amount in each fixed sampling period (e.g., 100 msec), namely a remaining rotation amount. The differentiator 312 then outputs the remaining rotation amount to the comparator 313 and the memory 314.

In every input of the remaining rotation amount outputted from the differentiator 312, the comparator 313 compares the remaining rotation amount with the minimum value of the remaining rotation amount (hereinafter referred to as a minimum residual, for convenience) after the start of execution of the control command. The comparator 313 then outputs, to the memory 314 and the timer 315, a signal representing whether or not the remaining rotation amount is smaller than the minimum residual.

The memory 314 stores the minimum residual and outputs the minimum residual to the comparator 313. When a signal representing that the remaining rotation amount is smaller than the minimum residual is received from the comparator 313, the memory 314 updates the minimum residual by the remaining rotation amount. On the other hand, when the remaining rotation amount is not smaller than the minimum residual, the memory 314 does not update the minimum residual.

The timer 315 counts, as a timer count value, the time elapsed from resetting. Then, the timer 315 resets the timer count value to 0 in every input of a signal representing that the minimum residual has been updated. The timer 315 outputs the timer count value to the output circuit 316.

The output circuit 316 compares the timer count value with a count value corresponding to a predetermined limit (hereinafter simply referred to as a limit value). When the timer count value reaches the limit value, it means that the minimum residual continues not to be updated over a period corresponding to the limit value, namely, the length of the non-update period has reached a period threshold corresponding to the limit value. When the timer count value reaches the limit value, the output circuit 316 outputs to the abnormality type determination unit 34 an abnormality signal representing that the rotation of the DC motor 2 has stopped (hereinafter referred to as a stop signal). Note that the limit value is set to a longer period than the sampling period, such as a value corresponding to about 10 to 100 times as long as the sampling period. For example, when the sampling period is 100 msec, the limit value is set to a value corresponding to 1 to several sec.

Figure 7:
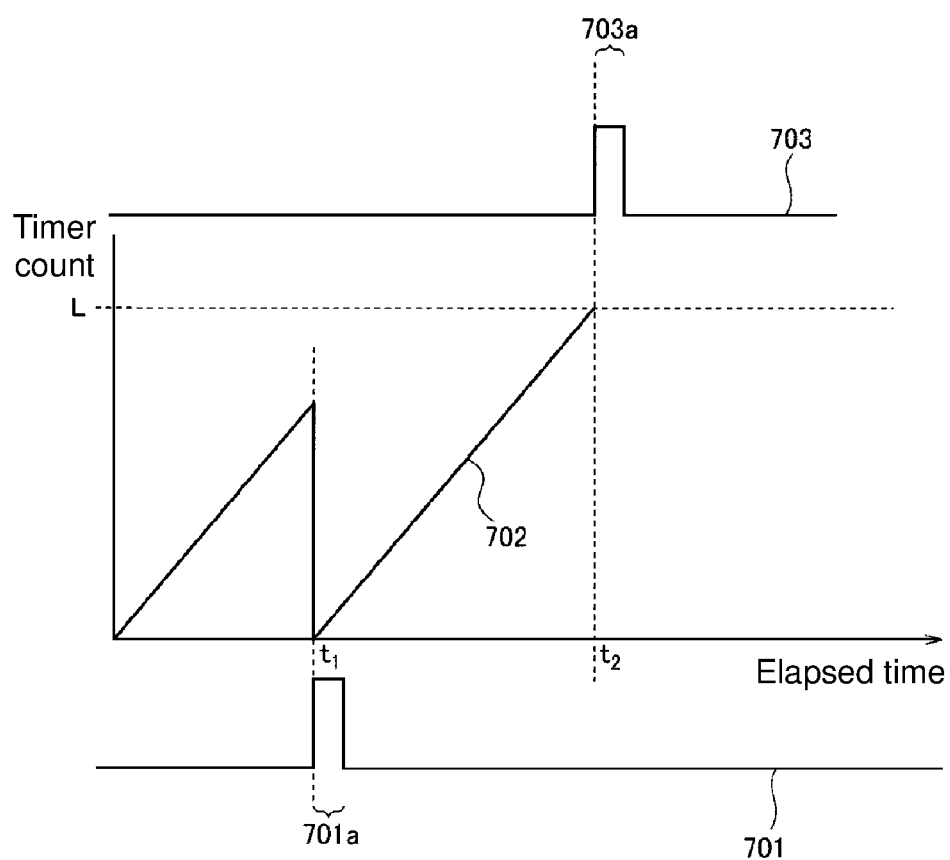
FIG. 7 is a timing chart illustrating an example of operation of the stop generation detector.

FIG. 7 is a timing chart illustrating an example of operation of the stop generation detector 31. In FIG. 7, a horizontal axis represents an elapsed time. A graph 701 represents a temporal change in output signal from the comparator 313 to the timer 315. Further, a graph 702 represents a temporal change in timer count value. A graph 703 represents a temporal change in output signal from the output circuit 316.

In this example, the timer count value is counted from a time t0. The timer count value increases until a time t1. A pulse 701a representing that the minimum residual has been updated is inputted from the comparator 313 into the timer 315 at a time t1. Hence, the timer count value is reset to 0 at the time t1. However, the signal representing that the minimum residual has been updated is not inputted into the timer 315 after the time t1. Hence, the timer count value increases after the time t1 and reaches a limit value L at a time t2. Thus at the time t2, a pulse 703a representing that the rotation of the DC motor 2 has stopped is outputted from the output circuit 316.

During execution of the control command, the intermittent stop detector 32 determines whether or not an abnormality has occurred in operation of the DC motor 2 based on the update frequency of the minimum residual in an immediate monitoring period.

Thus, the intermittent stop detector 32 performs, for example, a process similar to those in the counter 311, the differentiator 312, the comparator 313, and the memory 314 illustrated in FIG. 6, to determine whether or not the minimum residual has been updated in each predetermined sampling period. The intermittent stop detector 32 then counts the number of times the minimum residual was not updated (hereinafter referred to as the number of stopping times) during the immediate monitoring period. Note that the larger the number of stopping times, the lower the update frequency of the minimum residual.

When the number of stopping times is larger than a predetermined number-of-stopping-times threshold, namely when the update frequency of the minimum residual is not larger than an update frequency threshold corresponding to the number-of-stopping-times threshold, the intermittent stop detector 32 determines that the rotation of the DC motor 2 stops intermittently. Note that the monitoring period is set to a longer period than the sampling period, such as a period corresponding to about 10 to 100 times as long as the sampling period. For example, when the sampling period is 100 msec, the monitoring period is set to about 1 to several sec. The number-of-stopping-times threshold is set to one-third to one-half of the number of times of sampling periods included in the monitoring period.

Figures 8, 9:
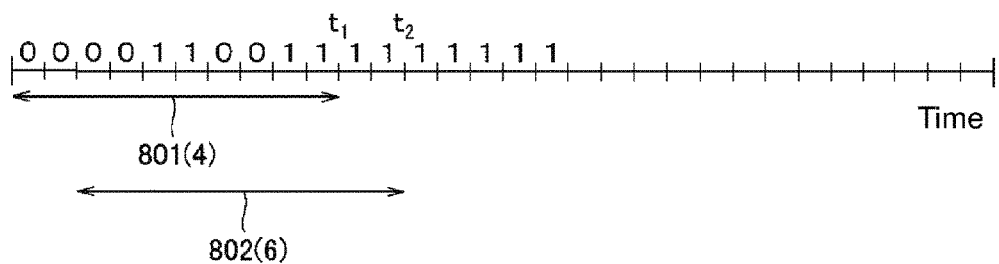
FIG. 8 is a timing chart illustrating an example of operation of the intermittent stop detector.
FIG. 9 is an example of a table representing a relation between an actual rotation speed and a decrease weighting amount.

FIG. 8 is a timing chart illustrating an example of operation of the intermittent stop detector 32. In FIG. 8, a horizontal axis represents time. Further, each of scale marks provided on the horizontal axis represents one sampling period. Then, a numerical value shown in each sampling period represents whether or not the minimum residual has been updated. In this example, '0' represents that the minimum residual has been updated in the sampling period, and '1' represents that the minimum residual has not been updated in the sampling period. Further, in this example, the monitoring period is assumed to be 10 times as long as the sampling period, and the number-of-stopping-times threshold is assumed to be 5.

In a monitoring period 801 ending at the time t1, the number of times the minimum residual was not updated is four, which is not larger than the number-of-stopping-times threshold. Thus at the time t1, the intermittent stop detector 32 does not determine that the DC motor 2 stops intermittently. In a monitoring period 802 ending at the time t2, the number of times the minimum residual was not updated is six, which is larger than the number-of-stopping-times threshold. Thus at the time t2, the intermittent stop detector 32 determines that the DC motor 2 stops intermittently.

As thus described, the intermittent stop detector 32 checks an operation status of the DC motor 2 based on the number of times the minimum residual was not updated during a fixed monitoring period. Hence, the intermittent stop detector 32 can detect that the rotation of the DC motor 2 has not stopped completely and intermittently stops its rotation.

Note that the intermittent stop detector 32 may count the number of times the minimum residual was updated in place of the number of times the minimum residual was not updated during the monitoring period. In this case, the intermittent stop detector 32 compares the number of times the minimum residual was updated with an update frequency threshold (set, for example, to a value obtained by subtracting the number-of-stopping-times threshold from a total number of sampling periods included in the monitoring period). When the number of times the minimum residual was updated is not larger than the update frequency threshold, the intermittent stop detector 32 may determine that the DC motor 2 stops intermittently.

When determining that the rotation of the DC motor 2 stops intermittently, the intermittent stop detector 32 outputs to the abnormality type determination unit 34 an abnormality signal representing the intermittent stoppage of rotation of the DC motor 2 (hereinafter referred to as an intermittent stop signal).

The speed decrease detector 33 detects that the rotation speed of the DC motor 2 has become lower than the target rotation speed during execution of the control command.

Thus, in each predetermined sampling period, the speed decrease detector 33 counts the number of detection signals from the rotary encoder 4, received in that sampling period. This number corresponds to the rotation speed of the DC motor 2, and the larger that number, the higher the rotation speed of the DC motor 2. Note that hereinafter the number of counts of detection signals from the rotary encoder 4 in each sampling period is referred to as an actual rotation speed.

In each sampling period, the speed decrease detector 33 compares the actual rotation speed with the number of counts (hereinafter referred to as a reference number of counts) of detection signals from the rotary encoder 4 in each sampling period corresponding to the target rotation speed. Note that a relation between the target rotation speed and the reference number of counts is previously set based on resolution of the rotary encoder 4, or the like. For example, a reference table representing the relation between the target rotation speed and the reference number of counts is previously stored into a non-volatile memory circuit (not illustrated) included in the control circuit 13. With reference to the reference table, the speed decrease detector 33 may simply specify the reference number of counts corresponding to the target rotation speed specified in the control command.

When the actual rotation speed is smaller than the reference number of counts, the speed decrease detector 33 obtains a decrease weighting amount in accordance with the actual rotation speed. For example, the decrease weighting amount is set in accordance with a ratio of the fastest value of a settable target rotation speed and an actual rotation speed.

FIG. 9 is an example of a table representing a relation between an actual rotation speed and a decrease weighting amount. In a table 900, each left-hand field shows an actual rotation speed and each right-hand field shows a decrease weighting amount corresponding to the actual rotation speed shown on the left hand of the field. In this example, the target rotation speed is set in 16 stages of 1 to 16 (the fastest value). The actual rotation speed is also divided in the same manner as the target rotation speed. However, since the actual rotation speed includes a stopping state, the actual rotation speeds are divided into 17 stages of 0 (stop) to 16 (fastest value). As shown in Table 900, the decrease weighting amount is set to a value obtained by subtracting from 1 the ratio of the actual rotation speed to the fastest value of the target rotation speed. Thus, the lower the actual rotation speed becomes, the larger the decrease weighting amount becomes.

The speed decrease detector 33 calculates a total of decrease weighting amounts during an immediate monitoring period. The speed decrease detector 33 then compares the total of decrease weighting amounts with a predetermined speed decrease amount threshold. When the total of decrease weighting amounts is larger than the speed decrease amount threshold, the speed decrease detector 33 detects a decrease in rotation speed of the DC motor 2. On the other hand, when the total of decrease weighting amounts is not larger than the speed decrease amount threshold, the speed decrease detector 33 does not detect the decrease in rotation speed of the DC motor 2. Note that the monitoring period is set to a longer period than the sampling period, such as a period corresponding to about 10 to 100 times as long as the sampling period.

Typically, the lower the target rotation speed, the more hardly the decrease in rotation speed of the DC motor 2 occurs. Thus, when the target rotation speed is low, even a slight speed decrease indicates that some abnormality may have occurred in the DC motor 2 or the movable body driven by the DC motor 2. Hence, in this example, the detection of the speed decrease is facilitated by increasing the decrease weighting amount more as the actual rotation speed becomes lower. Especially, the decrease weighting amount is decided using the ratio of the actual rotation speed to the fastest rotation speed, regardless of the target rotation speed. Thus, the lower the target rotation speed, the more easily the speed decrease is detected even when it is a slight decrease.

Note that, according to a modified example, the decrease weighting amount may be set to a value obtained by subtracting from 1 the ratio of the actual rotation speed to the target rotation speed.

Figure 10:
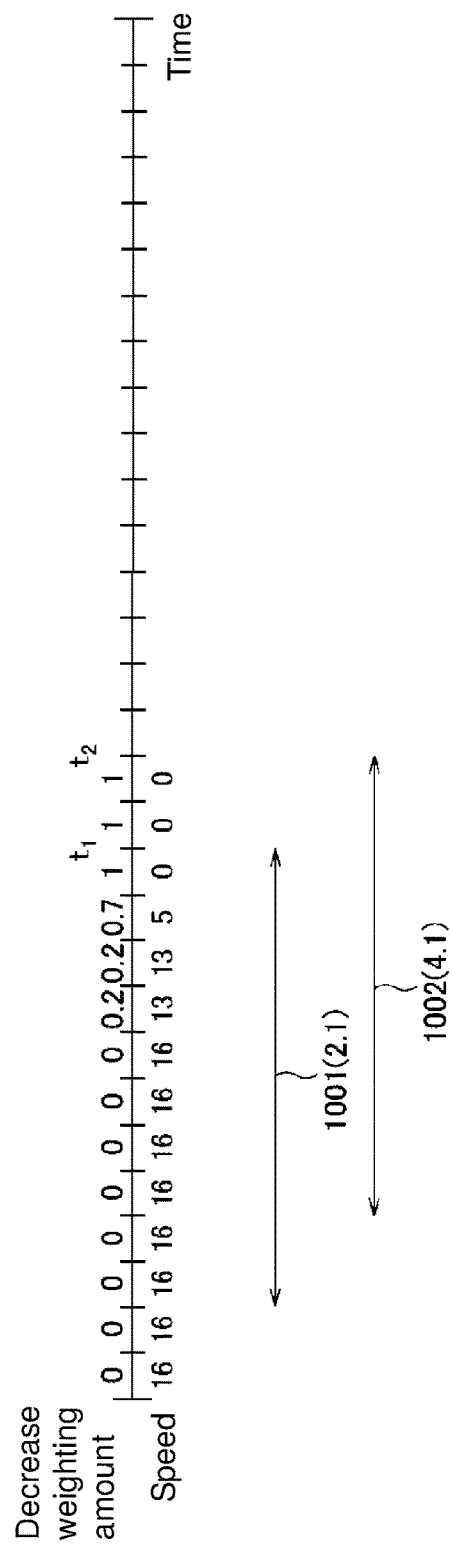
FIG. 10 is a timing chart illustrating an example of operation of a speed decrease detector.

FIG. 10 is a timing chart illustrating an example of operation of the speed decrease detector 33. In FIG. 10, a horizontal axis represents time. Further, each of scale marks provided on the horizontal axis represents one sampling period. In each sampling period, a numerical value shown below the horizontal axis represents an actual rotation speed, and a numerical value shown above the horizontal axis represents a decrease weighting amount. Further, in this example, the monitoring period is assumed to be 10 times as long as the sampling period, and the speed decrease amount threshold is assumed to be 3.

In a monitoring period 1001 ending at the time t1, a total of decrease weighting amounts is 2.1, which is not larger than the speed decrease amount threshold. Thus, at the time t1, the speed decrease detector 33 does not detect a speed decrease of the DC motor 2. Meanwhile, in a monitoring period 1002 ending at the time t2, a total of decrease weighting amounts is 4.1, which is larger than the speed decrease amount threshold. Thus at the time t2, the speed decrease detector 33 determines that the rotation speed of the DC motor 2 has decreased.

When determining that the rotation speed of the DC motor 2 has decreased, the speed decrease detector 33 outputs to the abnormality type determination unit 34 abnormality signal representing a decrease in rotation speed of the DC motor 2 (hereinafter referred to as a speed decrease signal).

The abnormality type determination unit 34 determines a type of an abnormality having occurred in the DC motor 2 based on combination of abnormality signals received in an immediate determination period (e.g., 1 to several sec) in each predetermined sampling period.

Figure 11:
FIG. 11 is a table representing a relation between a type of an abnormality and each abnormality signal received.

FIG. 11 is a table representing a relation between a type of an abnormality and each abnormality signal received. In the table 1100, each field at the right end represents a type of an abnormality. Further, fields on first to third columns from the left end represent reception states of the stop signal, the intermittent stop signal, and the speed decrease signal, respectively, which correspond to the types of the abnormality shown at the right end. In this example, 'H' represents that a corresponding abnormality signal has been received and 'L' represents that a corresponding abnormality signal has not been received.

For example, when an abnormality has occurred where the movable body driven by the DC motor 2 is vibrating slightly, namely when it is assumed that the movable body will not reach the target position and the total rotation amount of the DC motor 2 will not reach the target rotation amount, all of the stop signal, the intermittent stop signal, and the speed decrease signal are received. Meanwhile, when an abnormality has occurred where the DC motor 2 stops intermittently, namely when the movable body stops number of times in its way although it is assumed to be able to move to a target position, the intermittent stop signal and the speed decrease signal are received while the stop signal is not received. When an abnormality has occurred where the rotation speed of the DC motor 2 does not reach the target rotation speed although the DC motor 2 rotates almost without stopping, only the speed decrease signal is received. Note that, when no abnormality has occurred, none of the abnormality signals is received.

As thus described, the abnormality type determination unit 34 can determine the type of the abnormality having occurred in accordance with combination of the received abnormality signals. Therefore, for example, a reference table representing a relation between combination of received abnormality signals and the type of the abnormality is previously stored into the non-volatile memory included in the control circuit 13. The abnormality type determination unit 34 then refers to the reference table and can thereby specify the type of the abnormality which corresponds to combination of received abnormality signals.

When receiving any of the abnormality signals and specifying a type of an abnormality, the abnormality type determination unit 34 notifies the type of the abnormality to the command analysis circuit 22 of the communication circuit 11.

As described above, this motor control device detects an abnormality in operation of the DC motor based on a non-update period and an update frequency of the minimum residual and an actual rotation speed, which are calculated based on detection signals from the rotation angle sensor for detecting a rotation amount of the DC motor. Accordingly, this motor control device can detect an abnormality in operation of the DC motor and determine the type of the abnormality having occurred even when the DC motor does not stop completely.

Note that the present invention is not restricted to the above embodiment. According to a modified example, when the DC motor 2 includes a sensor for detecting rotation of the DC motor 2, such as a Hall element, the sensor may be used as the rotation angle sensor.

According to another modified example, the control circuit 13 may only include any one or two of the stop generation detector 31, the intermittent stop detector 32, and the speed decrease detector 33. In this case, the abnormality type determination unit 34 may be omitted. The motor control device may report only the occurrence of an abnormality to the upper-level control device.

The motor control device according to the above embodiment or modified example may be mounted in a game machine such as a slot game machine or a pinball game machine.

Figure 12:
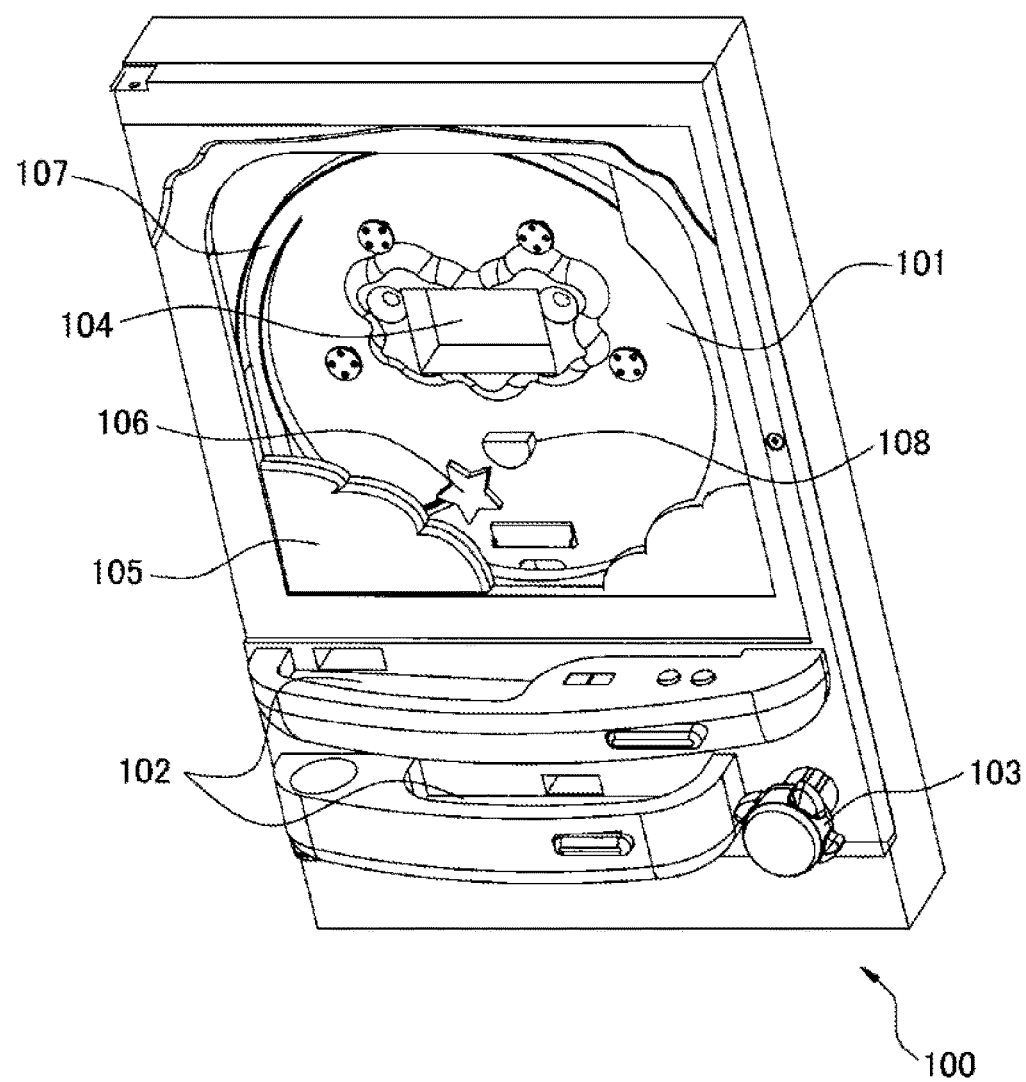
FIG. 12 is a schematic perspective view of a pinball game machine provided with a motor control device according to one embodiment or modified example of the present invention.
Figure 13:
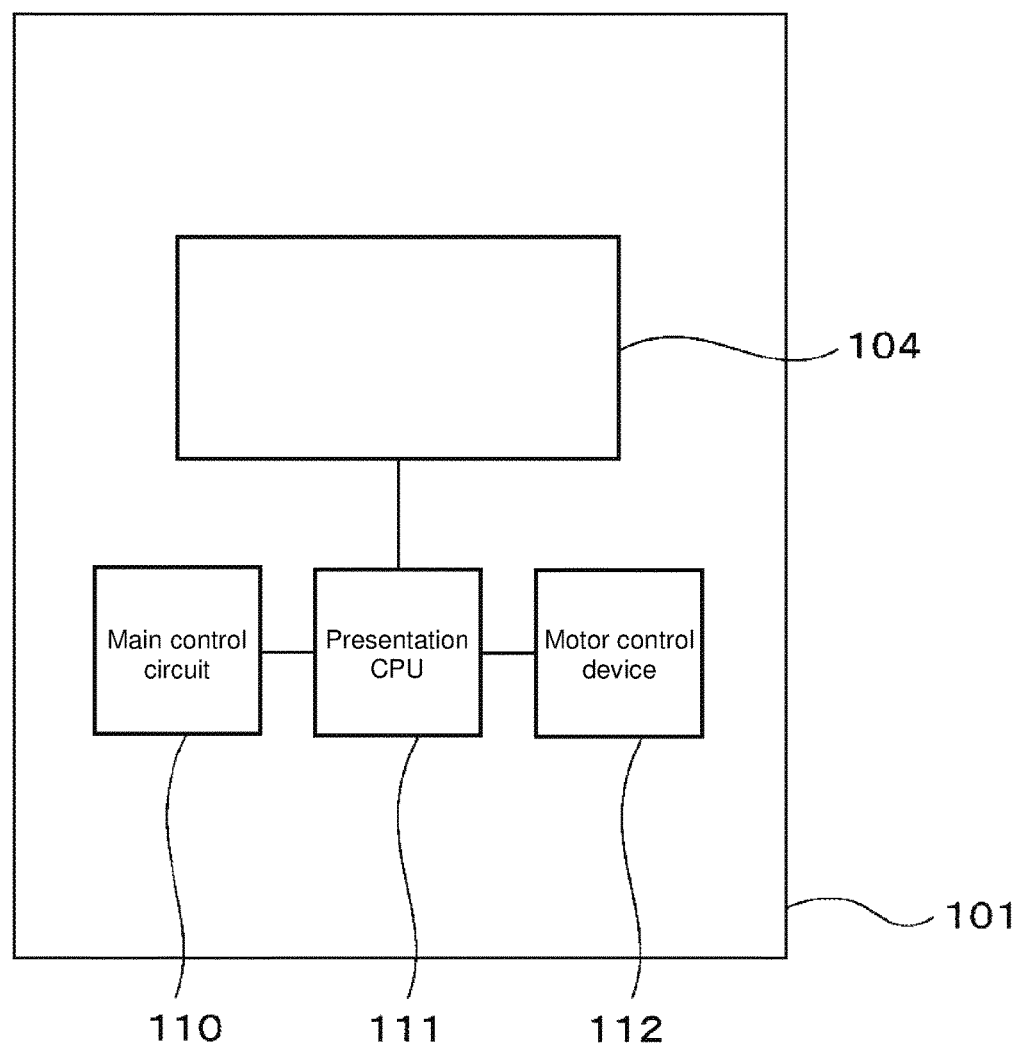
FIG. 13 is a schematic internal configuration view of the pinball game machine provided with the motor control device according to one embodiment or modified example of the present invention.

FIG. 12 is a schematic perspective view of a pinball game machine 100 provided with the motor control device according to the above embodiment or modified example. FIG. 13 is a schematic internal configuration view of the pinball game machine 100. As illustrated in FIG. 12, the pinball game machine 100 includes a game board 101 which is provided from the top portion to most part of the central portion and is the game machine body, a ball receptor 102 disposed below the game board 101, an operating unit 103 provided with a handle, and a display device 104 provided in substantially the center of the game board 101.

For presentation of a game, the pinball game machine 100 includes, on the front surface of the game board 101, a fixed accessory 105 disposed below the game board 101, and a movable accessory 106 disposed between the game board 101 and the fixed accessory 105. A rail 107 is provided at the side of the game board 101. A large number of obstacle spikes (not illustrated) and at least one prize winning device 108 are provided on the game board 101.

The operating unit 103 launches a game ball by predetermined force from a launch device, not illustrated, in accordance with a rotation amount of the handle by operation of the player. The launched game ball moves upward along the rail 107 and falls among a large number of obstacle spikes. When a sensor, not illustrated, detects that the game ball enters any of the prize winning devices 108, a main control circuit 110 provided on the rear surface of the game board 101 discharges the game ball to the ball receptor 102 via a ball dispenser (not illustrated) for putting out a predetermined number of game balls in accordance with the prize winning device 108 where the game ball has entered. Further, the main control circuit 110 causes the display device 104 to display a variety of images via a presentation CPU 111 provided on the rear surface of the game board 101.

The movable accessory 106 is an example of the movable body that moves in accordance with a state of a game. The movable accessory 106 is driven by a DC motor (not illustrated) provided on the rear surface of the game board 101 and controlled by a motor control device 112.

On the basis of a state signal representing a state of a game and transmitted from the main control circuit 110 to the presentation CPU 111, the presentation CPU 111 decides target coordinates and a moving speed of the movable accessory 106, and generates a control command in accordance with the decision. The presentation CPU 111 then outputs the generated control command to the motor control device 112. For example, before entry of the game ball into the prize winning device 108, the presentation CPU 111 transmits to the motor control device 112 a control command for specifying as a target rotation amount a rotation amount of the DC motor, which correspond to a movement distance of the movable accessory 106 from the current position to the lower left end of a movable range such that the fixed accessory 105 hides the movable accessory 106. Meanwhile, when the entry of the game ball into the prize winning device 108 is detected and a state signal showing the detection is inputted from the main control circuit 110 into the presentation CPU 111, the presentation CPU 111 generates a control command for specifying as a target rotation amount a rotation amount of the DC motor, which correspond to a movement distance of the movable accessory 106 from the current position to the upper right end of the movable range, and transmits the control command to the motor control device 112.

Further, when receiving an abnormality generation signal from the motor control device 112, the presentation CPU 111 may notify the main control circuit 110 that an abnormality has occurred.

The motor control device 112 is a motor control device according to the above embodiment or its modified example. On the basis of the control command received from the presentation CPU 111 and detection signals received from the rotary encoder (not illustrated), the motor control device 112 controls the DC motor such that the DC motor rotates at the target rotation speed (i.e., the movable accessory 106 moves at a speed in accordance with the target rotation speed) and stops when it has rotated by the target rotation amount (i.e. when the movable accessory 106 has reached a target place). Hence, the movable accessory 106 can accurately move to the target place in accordance with the presentation. Further, when an abnormality has occurred in operation of the DC motor or the movable accessory 106 as a control object, the motor control device 112 detects the occurrence of the abnormality and specifies the type of the abnormality. The motor control device 112 then notifies the presentation CPU 111 of an abnormality generation signal representing the type of the abnormality.

As thus described, a person skilled in the art can make a variety of changes in accordance with a mode that is executed in the scope of the present invention.

The invention claimed is:

1. A game machine motor control device for controlling a motor in a game machine, wherein:
the game machine comprises: a presentation controller configured to control a presentation of the game machine in accordance with a state of a game;
generate a control command; and
the device comprises:
a communication interface configured to receive from an external device the control command for defining a target rotation amount and a target rotation speed of the motor in accordance with the state of the game;
a sensor interface configured to receive a detection signal from a rotation angle sensor, the rotation angle sensor outputting the detection signal in response to rotation of the motor by a predetermined angle;
a controller configured to perform operations comprising deciding a set value of a rotation speed of the motor in accordance with the target rotation speed provided in the control command; and
a drive signal generator configured to generate a drive signal for rotating the motor in accordance with the set value of the rotation speed, and configured to output the drive signal,
wherein
the controller is configured to perform operations further comprising:
calculating a difference between the target rotation amount and a total rotation amount of the motor from start of execution of the control command based on the number of the received detection signals in a sampling period to generate a remaining rotation value,
comparing the remaining rotation value with a predetermined minimum value for the remaining rotation value, and updating the predetermined minimum value by the remaining rotation value when the remaining rotation value is smaller than the predetermined minimum value, and
determining an occurrence or a non-occurrence of an abnormality in operation of the motor based on at least one of:
an update frequency of updating the predetermined minimum value by the remaining rotation value during an immediate monitoring period, and
a length of a non-update period during the immediate monitoring period when the remaining rotation value is not smaller than the predetermined minimum value and the predetermined minimum value is not updated.

2. The game machine motor control device according to claim 1, wherein the controller determines the occurrence of the abnormality in operation of the motor when the update frequency during the immediate monitoring period is not larger than a predetermined update frequency threshold.

3. The game machine motor control device according to claim 1, wherein the controller determines the occurrence of the abnormality in operation of the motor when the length of the non-update period is longer than a predetermined period length threshold.

4. The game machine motor control device according to claim 1, wherein the controller measures an actual rotation speed of the motor based on the number of the received detection signals in the sampling period, and further determines the occurrence or the non-occurrence of the abnormality in operation of the motor based on the actual rotation speed, and when determining the occurrence of the abnormality in operation of the motor, the controller determines a type of the abnormality based on which of the update frequency, the length of the non-update period, and the actual rotation speed is used to determine the abnormality in operation of the motor.

5. The game machine motor control device according to claim 4, wherein the controller obtains a decrease weighting amount that increases with an increase in a difference between the target rotation speed and the actual rotation speed with respect to each of a plurality of predetermined sampling periods, and when a total of the decrease weighting amounts in the immediate monitoring period is larger than a predetermined threshold, the controller determines the occurrence of an abnormality in operation of the motor.

6. A game machine comprising:
a game machine body;
a movable body movably disposed on a front surface of the game machine body;
a motor configured to drive the movable body;
a rotation angle sensor configured to output a detection signal in response to rotation of the motor by a predetermined angle;
a motor control device configured to control the motor; and
a presentation controller configured to perform operations comprising controlling a presentation in accordance with a state of a game,
wherein
the presentation controller generates a control command for defining a target rotation amount and a target rotation speed of the motor in accordance with the state of the game, and transmits the control command to the motor control device,
the motor control device comprises:
a communication interface configured to receive a control command from the presentation controller,
a sensor interface configured to receive the detection signal from the rotation angle sensor,
a controller configured to perform operations comprising deciding a set value of a rotation speed of the motor in accordance with the target rotation speed provided in the control command, and
a drive signal generator configured to generate a drive signal for rotating the motor in accordance with the set value of the rotation speed, and configured to output the drive signal,
wherein
the controller of the motor control device is configured to perform operations further comprising:
calculating a difference between the target rotation amount and a total rotation amount of the motor from start of execution of the control command based on the number of the received detection signals in a sampling period to generate a remaining rotation value,
comparing the remaining rotation value with a predetermined minimum value for the remaining rotation value, and updating the predetermined minimum value by the remaining rotation value when the remaining rotation value is smaller than the predetermined minimum value, and determining an occurrence or a non-occurrence of an abnormality in operation of the motor based on at least one of:
an update frequency of updating the predetermined minimum value the remaining rotation value during an immediate monitoring period, and
a length of a non-update period during the immediate monitoring period when the remaining rotation value is not smaller than the predetermined minimum value and the predetermined minimum value is not updated.

7. The game machine according to claim 6, wherein the controller determines the occurrence of the abnormality in operation of the motor when the update frequency during the immediate monitoring period is not larger than a predetermined update frequency threshold.

8. The game machine according to claim 6, wherein the controller determines the occurrence of the abnormality in operation of the motor when the length of the non-update period is longer than a predetermined period length threshold.

9. The game machine according to claim 6, wherein the controller measures an actual rotation speed of the motor based on the number of the received detection signals in the sampling period, and further determines the occurrence or the non-occurrence of the abnormality in operation of the motor based on the actual rotation speed, and when determining the occurrence of the abnormality in operation of the motor, the controller determines a type of the abnormality based on which of the update frequency, the length of the non-update period, and the actual rotation speed is used to determine the abnormality in operation of the motor.

10. The game machine according to claim 9, wherein the controller obtains a decrease weighting amount that increases with increase in difference between the target rotation speed and the actual rotation speed with respect to each of a plurality of predetermined sampling periods, and when a total of the decrease weighting amounts in the immediate monitoring period is larger than a predetermined threshold, the controller determines the occurrence of an abnormality in operation of the motor.

11. A method implemented in a game machine, the method for detecting an abnormality in operating a motor in the game machine, wherein
the game machine comprises: a presentation controller configured to: control a presentation of the game machine in accordance with a state of a game; and generate a control command; and
the method comprising:
receiving the control command for defining a target rotation amount and a target rotation speed for the motor in accordance with the state of the game;
receiving a detection signal from a rotation angle sensor, the rotation angle sensor outputting the detection signal of the motor in response to rotation of the motor by a predetermined angle;
deciding a set value for a rotation speed of the motor in accordance with the target rotation speed provided in the control command;
generating a drive signal for rotating the motor in accordance with the value for the rotation speed;
outputting the drive signal to the motor;
calculating a difference between the target rotation amount and a total rotation amount of the motor from start of execution of the control command based on the number of received detection signals in a sampling period to generate a remaining rotation value;
comparing the remaining rotation value with a predetermined minimum value for the remaining rotation value, and updating the predetermined minimum value by the remaining rotation value when the remaining rotation value is smaller than the predetermined minimum value;
and
determining an occurrence or a non-occurrence of an abnormality in operation of the motor based on at least one of:
an update frequency of updating the predetermined minimum value by the remaining rotation value during an immediate monitoring period, and
a length of a non-update period during the immediate monitoring period when the remaining rotation value is not smaller than the predetermined minimum value and the predetermined minimum value is not updated.

12. The method for detecting an abnormality in operating a motor according to claim 11, wherein the occurrence of the abnormality in operation of the motor is determined when the update frequency in an immediate monitoring period is not larger than a predetermined update frequency threshold.

13. The method for detecting an abnormality in operating a motor according to claim 11, wherein the occurrence of the abnormality in operation of the motor is determined when the non-update period is longer than a predetermined period threshold.

14. The method for detecting an abnormality in operating a motor according to claim 11, further comprising:
measuring an actual rotation speed of the motor based on the number of the received detection signals in a predetermined sampling period, and
determining the occurrence or the non-occurrence of the abnormality in operation of the motor based on the actual rotation speed, wherein
when determining the occurrence of the abnormality in operation of the motor, a type of the abnormality is determined based on which of the update frequency, the length of the non-update period, and the actual rotation speed is used to determine the abnormality in operation of the motor.

15. The method for detecting an abnormality in operating a motor according to claim 14, further comprising: obtaining a decrease weighting amount that increases with increase in difference between the target rotation speed and the actual rotation speed with respect to each of a plurality of predetermined sampling periods, and
determining the occurrence of the abnormality in operation of the motor based on when a total of the decrease weighting amounts in the immediate monitoring period is larger than a predetermined threshold.

* * * * *